United States Patent

Schlutz et al.

[15] 3,672,564

[45] *June 27, 1972

[54] ROTARY FLUID SEAL AND DISTRIBUTION MEANS FOR CENTRIFUGES

[72] Inventors: Charles A. Schlutz; David Bellamy, Jr., both of Glenview, Ill.

[73] Assignee: Baxter Laboratories, Inc.

[*] Notice: The portion of the term of this patent subsequent to Oct. 17, 1984, has been disclaimed.

[22] Filed: Nov. 12, 1969

[21] Appl. No.: 871,242

Related U.S. Application Data

[60] Division of Ser. No. 672,125, Oct. 2, 1967, abandoned, which is a continuation-in-part of Ser. No. 366,994, May 13, 1964, Pat. No. 3,347,454.

[52] U.S. Cl. .............................................. 233/26, 285/136
[51] Int. Cl. .......................................................... B04b 9/12
[58] Field of Search ........................ 233/1, 16, 21, 26, 22, 14, 233/27, 17, 28, 19 R; 285/136, 134, 190; 277/59, 71, 72

[56] References Cited

UNITED STATES PATENTS

| | | |
|---|---|---|
| 2,834,541 | 5/1958 | Szent-Gyorgyi et al. ................. 233/26 |
| 3,145,713 | 8/1964 | Latham ................................. 233/1 UX |
| 3,460,749 | 8/1969 | Martin ....................................... 233/1 |
| 2,557,498 | 6/1951 | Collender ............................... 285/136 |
| 2,768,843 | 10/1956 | Zeilman ............................. 285/136 R |
| 2,781,134 | 2/1957 | Weir et al. ......................... 285/136 R |
| 3,561,672 | 2/1971 | Schlutz et al. ......................... 233/17 |

FOREIGN PATENTS OR APPLICATIONS

| | | |
|---|---|---|
| 984,323 | 2/1965 | Great Britain ........................ 233/26 |
| 759,098 | 10/1956 | Great Britain .................. 285/136 R |
| 859,491 | 1/1961 | Great Britain .................. 285/136 R |

*Primary Examiner*—Jordan Franklin
*Assistant Examiner*—George H. Krizmanich
*Attorney*—Samuel B. Smith, Jr. and W. Garrettson Ellis

[57] ABSTRACT

A rotary seal for a centrifuge particularly usable in the process of cell washing for transferring fluid between a rotary member and a stationary member of an apparatus adapted to contain fluids. The rotary seal member comprises a hollow first housing, and a second housing disposed in the first housing in spaced relation therewith to define an annular chamber. One of the housings is rotatable in concentric relation relative to the other housing. A plurality of sealing means are transversely mounted between the first and second housings to divide the annular chamber into several separate sealed portions, and conduits lead from the exterior of both the first and second housings to separate sealed portions of the annular chamber.

4 Claims, 8 Drawing Figures

INVENTORS
CHARLES A. SCHLUTZ
DAVID BELLAMY, JR.
BY W. Garretson Ellis
ATTORNEY

INVENTORS
CHARLES A. SCHLUTZ
DAVID BELLAMY, JR.
BY W. Garrettson Ellis
ATTORNEY

PATENTED JUN 27 1972 3,672,564

INVENTORS
CHARLES A. SCHLUTZ
DAVID BELLAMY, JR.
BY W. Garretson Ellis
ATTORNEY 3,672,564

ROTARY FLUID SEAL AND DISTRIBUTION MEANS FOR CENTRIFUGES

This application is a Division of application Ser. No. 672,125, filed Oct. 2, 1967, and now abandoned which, in turn, is a Continuation-In-Part application of Ser. No. 366,994 now U.S. Pat. No. 3,347,454, filed May 13, 1964, by David Bellamy, Jr. and Charles A. Schlutz, entitled "Method and Apparatus for the Centrifugal Washing of Particles in a Closed System."

The present invention is an improvement of the unique bag, which bag was first described in generalized terms in the said patent application. The present invention relates to a bag having a defined configuration within a range of ratio dimensions as will be set forth below.

As was stated in the parent application, recently there has developed the need in various fields relating to the biological sciences for an apparatus and a method of washing tiny particles, such as biological cells, within a substantially closed system to minimize the risk of contamination. It will be appreciated that an important area of activity in which such a need is particularly urgent is the area which relates to the preservation of blood. In recent years, various of the researchers in the aforementioned area of activity have proposed new techniques for extending the storage life of human blood from the present 21 day period to an indefinite period. The proposed techniques generally comprise adding a preservative to the blood and then freezing the blood until time of use. The success of the newly proposed technique is generally believed to be dependent upon two factors: the first is finding a preservative which can become sufficiently concentrated within the blood cell mass to protect the cells from physical damage during the processes of freezing, storage and thawing, and second, effectively removing the preservative prior to the transfusion of the blood.

Additionally, it has now been found that the construction of the bag utilized during the separation process is also an important factor in carrying out the concept of preserving blood. In other words, the bag by its dimensional configuration must be of a type which does not result in corners lending to the possibility of occlusion and breakdown of cells.

As stated, the first problem is that of finding a suitable preservative agent which has been solved to a large extend by the discovery that glycerol, polyvinyl pyrrolidone and/or dimethyl sulfoxide becomes sufficiently concentrated within the blood cell mass to prevent the aforementioned physical damage to the cells. On the other hand, the second problem, that of removing the preservative, has up to the present time only been accomplished with difficulty and by time-consuming techniques. The availability of an apparatus and a method for quickly and adequately washing impurities from red blood cells and similar products within a closed system could and would substantially contribute to the further success of the above-mentioned techniques.

As was mentioned above, the present invention contemplates a flexible, collapsible plastic bag having a unique configuration. The bag is to be utilized in a centrifuge having an inner side and bottom configuration to accommodate the lower portion of the bag which will have a cone configuration with a rounded apex portion. The upper portion of the bag which is in mirror relationship with the lower portion will also have a cone configuration, generally, wherein the height of the second cone with respect to the first cone extends from a zero to one ratio to a greater than one to one ratio. In other words, when the second cone has a zero height, the overall configuration of the bag of the present invention gives the appearance of being a single cone having a slightly rounded apex portion. Additionally, it is also contemplated in an embodiment that the bag of the present invention will have an intermediate portion which can also be said to comprise a base for the two cone portions wherein the intermediate portion is generally cylindrical.

The bag to be utilizable with a centrifuge must have an egress port and an ingress port. Accordingly, an ingress port for wash fluid is provided in that portion of the bag which constitutes the upper cone portion. A flexible plastic tube is heat sealed into the ingress port and has one end thereof which terminates within the rounded apex portion of the lower portion. Preferably, the end section of the tube is perforated so that greater fluid distribution is thereby obtainable. Another flexible plastic tube is heat sealed into the egress port and terminates at that point. The egress point is located generally with respect to the upper portion.

The manufacture of the bag of the present invention is relatively easy, requiring merely the placement in overlapping position of two sheets of thermoplastic material, such as polyvinyl chloride. The two sheets of overlapping plastic material are then inserted between the jaws of a heat sealing tool which is adapted to heat seal a peripheral outline identical to the desired bag. Suitable ingress and egress ports may then be punched into the thermoplastic material and the tubes mentioned above may then be heat sealed into position. On the other hand, ports may be punched in the sheets before heat sealing. The flashing is then trimmed and the bag is ready for use.

The bag of the present invention is utilized by being positioned with its contents therein, such as blood cells and the like in a cup of a centrifuge. The ingress tube is hooked up to a container means via a rotary seal carrying wash fluid and the egress tube is hooked up to a receiver for the effluent. The bag distorts by distention due to radial centrifugal force and hydraulic head pressure. This stretching performs two functions: (1) it removes wrinkles and (2) forces the bag to conform to the geometry of the centrifuge cup, thereby assuming a shape calculated to effect efficient counterflow of the wash fluids through the red cell mass.

In order to more fully comprehend the various ramifications of the present invention, it appears germane at this point to discuss the various figures. Accordingly, attention is directed to the accompanying drawings wherein.

Figure 1:
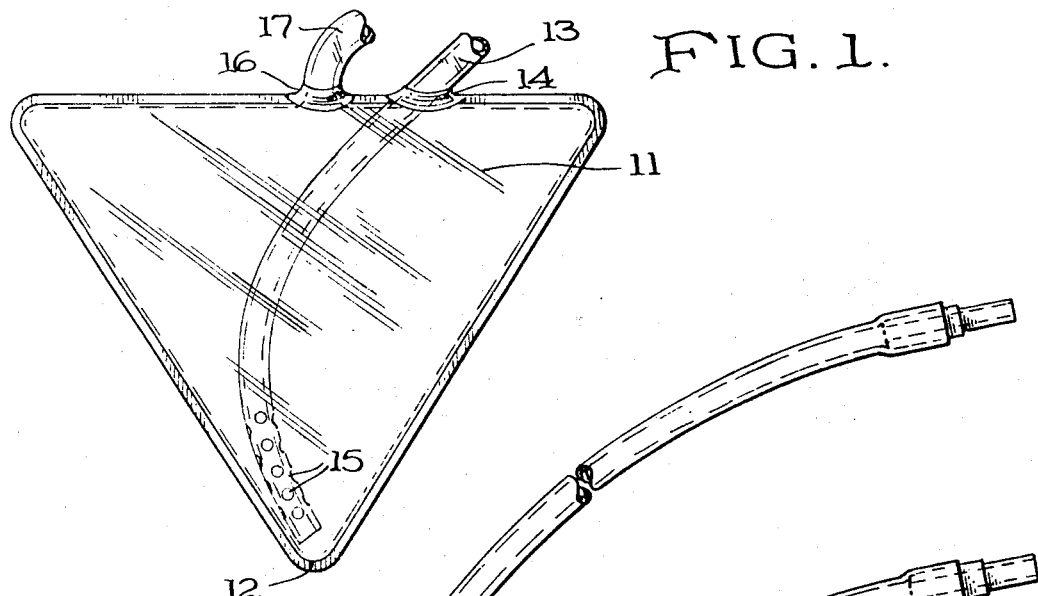
FIG. 1 is a side elevation of one embodiment of the bag of the present invention in an uninflated condition.

FIG. 1 illustrates a transparent flexible plastic collapsible bag or fluid receiving means 11 having a cone configuration wherein apex 12 is slightly rounded in order to avoid sharp corners. Since there is no upper portion in mirror relationship as mentioned above, the ratio of the height of the smaller cone to the larger cone can be said to be zero to one. A flexible plastic tube 13 is heat sealed into a liquid tight condition into ingress port 14, which constitutes a collar of plastic material in the opening in the bag. The end of tube 13 terminates in the rounded apex portion 12 and has a plurality of perforations 15 therein through which the wash fluid may enter the bag. The wash fluid passes from the apex portion 12 through the entire bag 11 as a moving diverging fluid front and is collected centrally and conveyed out of the bag through egress port 16, also a plastic collar in an opening, which has a fluid tube 17 connected thereto.

Figure 2:
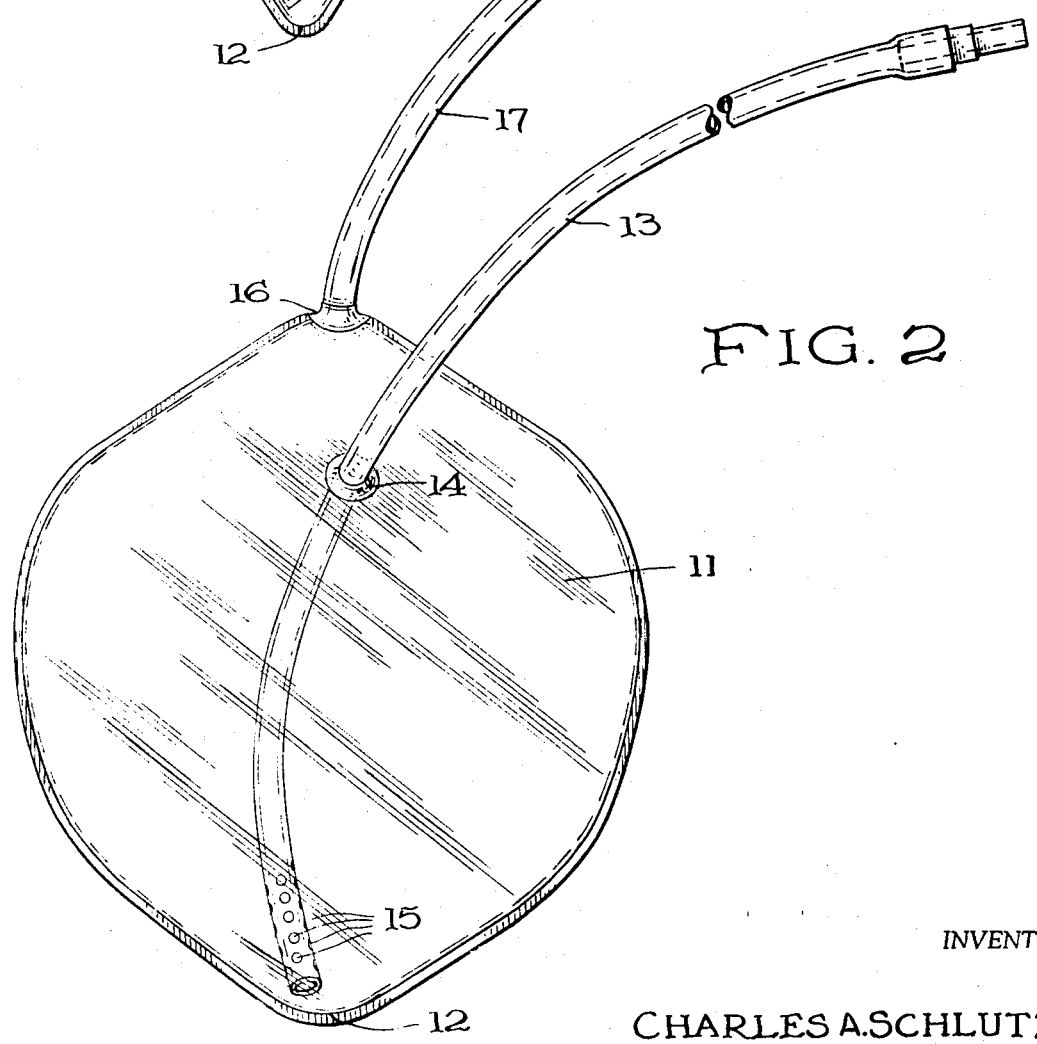
FIG. 2 is another embodiment of the bag of the present invention in an uninflated condition.

From FIG. 2, which, as shown, is uninflated, it will be discerned that the ratio of the height of the large cone portion to the smaller cone portion is no longer a one to zero ratio but is closer to a one to one; but as shown in FIG. 2, the height ratio is approximately 0.5 for the upper smaller cone to 1 for the lower larger cone.

Figure 3:
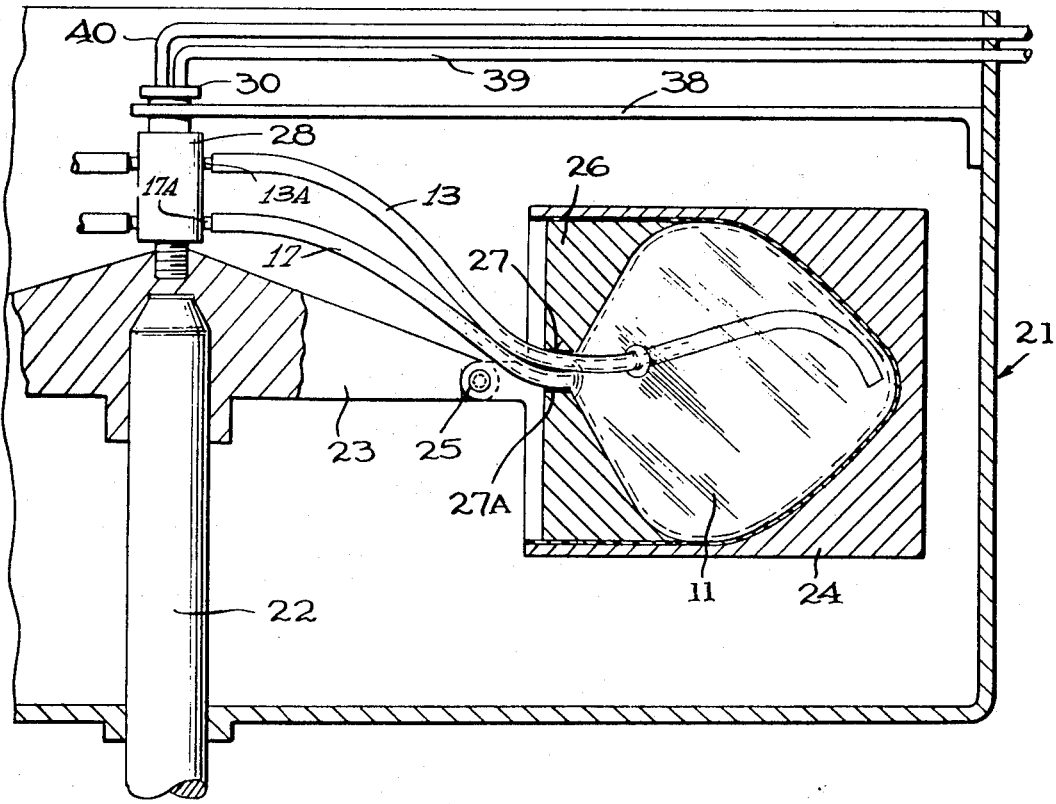
FIG. 3 is a vertical section showing the novel apparatus utilizing the bag of the present invention.

Turning to FIG. 3, there is illustrated a vertical section of a rotary type of centrifuge 21. The spindle 22 of the centrifuge supports a rotor 23 which is provided with Teflon coated bag receiving cups 24 (only one is shown) which are pivotally mounted to the rotor 23 at 25. Positioned within the cup 24 is the disposable, flexible, collapsible bag 11, which is provided, as mentioned before, with an integral inlet tube 13 and an integral outlet tube 17. It will be seen that cups 24 possess an internal shape to accommodate and support the lower cone portion of the bag 11. A weight retaining means 26 comprising split circular portions is positioned at the other side of the bag and has an underside configuration approximating the upper cone portion. Between the support portion of the cup and the retaining means 26 the bag 11 is completely surrounded and given support at all points when the bag is distended by filling and is subjected to centrifugal force.

Figure 5:
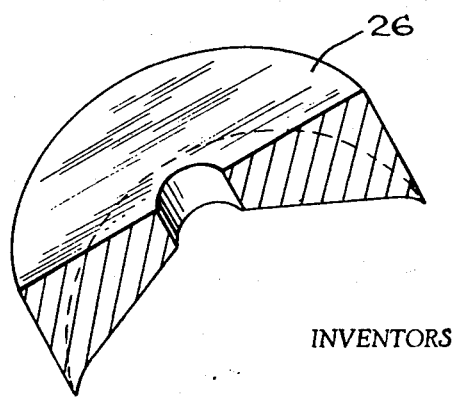
FIG. 5 is a perspective view of one-half of a retaining means utilized in carrying out the invention.

Digressing for a moment, attention is directed to FIG. 5 from whence one can see one-half of the split retaining means 26 which is constructed to fit relatively snugly within the cup 24 and may slide axially with respect thereto.

Communication with the interior of the bag 11 is had through the integral inlet tube 13 and the integral outlet tube 17, which lead from the bag through an opening 27 resulting from confronting grooves 27A in each half of the retaining means 26, to the rotary seal 28. To provide communication with the interior of the seal, the free ends of inlet tube 13 and the outlet tube 17 are joined to the inlet connection 13A and the outlet connection 17A of the rotary seal 28.

Figure 4:
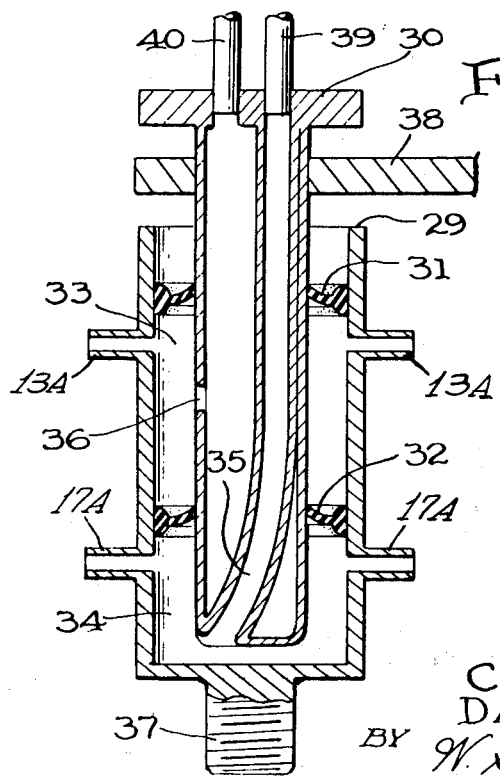
FIG. 4 is an enlarged section view of the novel fluid distribution means of the present invention.

The rotary seal 28, as illustrated in FIG. 4, is comprised of a hollow cylindrical housing 29 and a stationary shaft 30. A major portion of the stationary shaft 30 is positioned within the inner chamber of the housing 29 of the rotary seal and maintained in such position by a pair of seals 31 and 32. The seals 31 and 32 are spaced apart and cooperate with the shaft to divide the interior of the housing 29 into two distinct compartments 33 and 34, respectively. The seals 31 and 32 frictionally engage the stationary shaft 30 and maintain the compartments 33 and 34 fluid tight and distinct from one another.

As seen in FIG. 4, the stationary shaft 30 is provided with the passageways 35 and 36. The passageway 35 extends through the stationary shaft 30 and communicates only with compartment 34. Passageway 36, which comprises the remainder of the interior of the hollow stationary shaft 30, opens into and communicates only with compartment 33.

The housing 29 is further provided with means 37 for securing it to the rotor 23, in the manner seen in FIG. 3. When thus secured, the housing 29 rotates freely with the rotor. The shaft 30 is maintained in a stationary position by stabilizing means 38, thereby preventing it from rotating with the rotor. The means 38 may take various forms, for example the bracket seen in FIG. 3.

In the preferred embodiment of the invention, the centrifuge employed is a rotary type refrigerated centrifuge. The rotor of the preferred centrifuge has four bag receiving swinging bucket type compartments which are provided with 600 ml. stainless steel cups with a plastic coated interior. The centrifuge should be capable of 5,000 revolutions per minute and is provided with adequate temperature controls to prevent damage to the red blood cells as the result of over-heating.

The preferred centrifuge is provided with means such as a threaded female member in the center of the rotor which enables the rotary seal to be attached. The centrifuge is also provided with openings for the tubes 39 and 40 which allow for the introduction and removal of a sterile wash fluid.

In the preferred embodiment, the rotary seal 28 is formed of suitably inexpensive materials to allow it to be discarded after a single use. Preferably, the housing 29 is a generally cylindrical plastic member with an interior chamber having a diameter of ¾ inches, and a depth of 1½ inches. Communicating with the interior chamber are the inlet and outlet connections 13A and 17A respectively. When employed with the previously described centrifuge, the rotary seal is equipped with four separate inlet connections 13A and an equal number of outlet connections 17A to provide for the introduction of wash fluid into and the removal of wash fluid from a container positioned in each of the container-receiving cups.

Preferably, the stationary shaft 30 has an outer diameter of approximately three-eighth inches. Located at the bottom of the shaft is the entrance to the passageway 35 which extends throughout the length of the shaft and communicates with the wash fluid outlet tube 39. Intermediate the length of the shaft is the exit from the passageway 36. Passageway 36 comprises the remainder of the interior of the otherwise hollow stationary shaft and completely surrounds the passageway 35. The shaft 30 may be formed completely of a single material such as steel, but, preferably a combination of materials, such as rubber, metal and plastic is used to provide the optimum resistance to wear and leakage at the lowest possible cost.

While in the preferred embodiment the shaft 30 has been described as stationary and the housing 29 as rotary, it will be readily understood by those skilled in the art that the housing can be made stationary and the shaft can be made rotary, if the two parts are inverted and reversed.

The seals 31 and 32 are formed of a resilient material, such as plastic or rubber. Preferably they are shaped to conform to and cooperate with the outer surface of the stationary shaft so as to prevent the flow of fluid between the shaft and the seal. These seals are fastened within the housing 29 by any suitable means, such as press fitting, welding, heat sealing, gluing or the like. In the preferred embodiment, the seals are circular in shape having an outer diameter of ¾ inches and an inner diameter of ⅜ inches, and, they are positioned ½ and 1¼ inches from the interior bottom of the housing chamber, respectively.

The flexible bags 11 are sterilized prior to use. The overall length of the tube 17 and that portion of the tube 13 which extends outside the container is not critical and need only be such that it will provide for direct or indirect connection to the inlet and outlet connections of the housing 29 without interfering with the operation of the apparatus.

When it is intended to employ the containers 11 for the washing of red blood cells, the container may be modified to allow it to serve as an original blood donation receiving container. Such modifications might simply comprise equipping the inlet tube 13 with a donor needle, and the outlet tube 17 with a suitable protective closure (e.g., such as that disclosed in U. S. Pat. No. 2,894,510). Upon the collection of a blood donation the inlet tube 13 may be heat sealed to provide a hermetically sealed container. The tube 13 could later, at time of use, be reopened for attachment to the inlet tube connection 13A.

In the described embodiment, the retaining means 26, the bag receiving cup 24 and the bag 11 all cooperate to shape and locate the bag so as to provide for the optimum outletting of the fluid. This desired result is generally achieved when the outlet tube is positioned closer to the axis of rotation of the centrifuge than any other portion of the bag. When the outlet tube is so positioned, the likelihood of the existence of "dead spots" which contain incompletely or unwashed particles is substantially reduced.

In other embodiments of the invention, as, for example, where the shape of the bags is materially varied, such as having a zero height upper cone configuration, it will generally be necessary to employ differently shaped retaining means to obtain the desired optimum outletting of the fluid, such as a flat retaining means. Preferably, the retaining means 26 is constructed of metal of sufficient weight and suitable shape to prevent the pressure, which is built up within the plastic bags by the fluid distribution system, from rupturing the walls of the bags.

When they are employed for the removal of impurities, such as preservatives from blood, the plastic bags and their contents are placed within the bag receiving cups with the inlet and outlet tubes extending toward the axis of the centrifuge. The retaining means 26 is then placed into position with the inlet tube 13 and the outlet tube 17 extending through opening 27. The free ends of the inlet and outlet tubes 13 and 17 are then attached to the inlet and outlet connections 13A and 17A of the rotary seal, respectively. The rotary seal is then secured to the rotor and the stationary shaft 30 of the rotary seal is stabilized by means of the bracket or other stabilizing means 38. Centrifugation is then commenced and a sterile washing fluid is introduced under gravity pressure or pumping via the wash fluid inlet tube 40. The fluid passes through the wash fluid inlet tube 40 and the passageway 36 of the shaft and flows via the inlet tube 13 into the plastic bag 11. After the wash fluid enters the interior of the container 11, it leaves the inlet tube through the perforations 15 in the form of a myriad of tiny streams. Due to the centrifugal pressure, the cells are not carried out of the bag 11 through outlet tube 17. Upon leaving the bag, the spent wash fluid travels via the outlet tube 17 to the lower compartment 34 of the rotary seal. It then enters the interior of the stationary shaft 30, via the passageway 35, and out of the shaft through wash fluid discard tube 39. The circulating of the wash fluid through the stationary shaft 30 cools the shaft, and thereby effectively prevents the seals 31 and 32 from being destroyed by the heat that generates from the frictional contact with the shaft.

As was stated in the above when the system is operating wash fluid flows continuously through the red cell mass and is collected continuously through the rotary seal and is dispelled.

Figure 6:
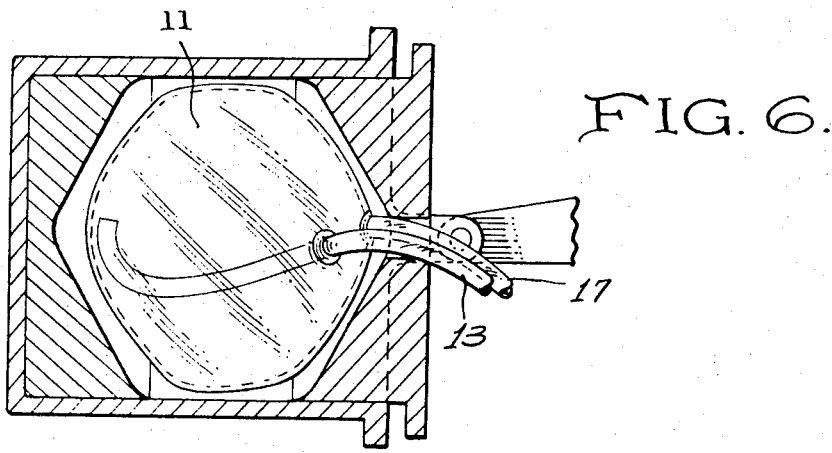
FIG. 6 is an axial cross sectional view of the centrifuge cup containing the bag in its initial condition.
Figure 7:
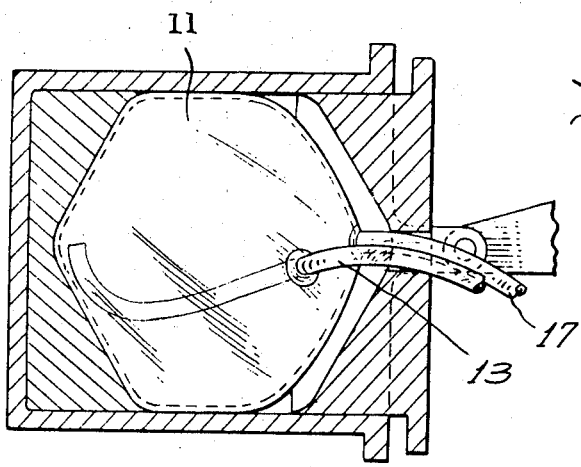
FIG. 7 is the same view as in FIG. 6 with the bag in partially inflated condition.
Figure 8:
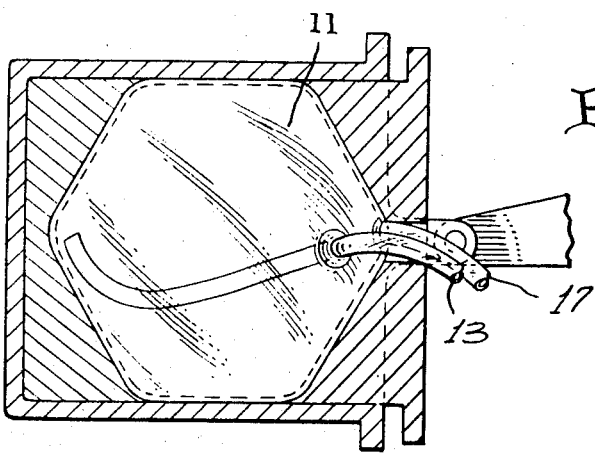
FIG. 8 is the same view as in FIG. 6 wherein the bag is under maximum distention with the bag conforming to the limiting geometry described for it.

Attention is directed to FIGS. 6, 7 and 8 from whence one can see the changes in three stages of the bag shape. In other words, from FIG. 6 it will be noted that the bag in its initial stage prior to filling will have a free form shape. From FIG. 7, where the bag has been partially filled, it will be noted that there is some distention in the lower cone portion so that the lower portion of the centrifuge cup is in direct abutment with the lower cone portion of the bag. From FIG. 8 it will be noted that the bag now describes a configuration, due to its distention, following the geometry of the centrifuge cup and the weight 26 positioned thereon. In effect, this preferred embodiment of the bag gives an appearance of two cones joined by a cylinder.

In the foregoing discussion, the novel apparatus and method of the present invention have been described in detail in connection with the washing of red blood cells free of preservatives. It is to be understood, however, that the invention can be employed with considerable success for washing a wide variety of particles, including other types of biological cells, human formed elements, and the like, free of an equally wide variety of impurities, such as bacteria, viruses and the like.

From the foregoing description, it will also be readily apparent to those skilled in the art that the present invention provides many advantages over the prior art devices. For example, it permits the simultaneous washing of the contents of a plurality of containers of equal volume without a co-mingling or cross contamination, and, it allows the washing to be done in a disposable and substantially closed system.

Still other advantages not described herein will be apparent to those skilled in the art.

What is claimed is:

1. A fluid seal and distribution means in combination with a centrifuge having a rotor, a rotatable spindle mounted thereto and at least one fluid receiving means supported by said rotor, said fluid seal and distribution means comprising a first housing closed at one end and having means coaxial with said housing extending from the closed end for mounting said housing on said rotor along the axis of said spindle thereby to rotate with said rotor, a second housing disposed concentrically within said first housing and spaced from the closed end thereof, said second housing having an outer diameter which is less than the inner diameter of said first housing defining an annular space between housings, a first annular seal supported by one of said housings and extending across said annular space into sealing contact with the other of said housings, said first annular seal being spaced from the bottom of the first housing defining between said bottom and said first seal a first fluid zone, a second annular seal supported by one of said housings and extending across said annular space into sealing contact with the other of said housings, said second annular seal being spaced above said first seal defining between said seals a second fluid zone, at least one fluid port in said first housing communicating with each of said zones, said fluid ports having fluid connection means in fluid connection with said receiving means and flow to said receiving means is from one zone and to the other zone, first conduit means in said second housing communicating with said first zone and terminating exteriorly with respect to said fluid distribution means, and second conduit means in said second housing communicating with said second zone and terminating exteriorly with respect to said fluid distribution means.

2. The combination of claim 1 wherein said rotor supports a pair of fluid receiving means disposed equidistantly from one another about said spindle, said first housing including a pair of ports in said first and second zones.

3. The rotatable fluid distribution means of claim 1 wherein the seals are of elastomeric material.

4. The rotatable fluid distribution means of claim 1 wherein the first housing has a cup configuration.

* * * * *

UNITED STATES PATENT OFFICE
CERTIFICATE OF CORRECTION

Patent No. 3,672,564                Dated June 27, 1972

Inventor(s) Charles A. Schlutz and David Bellamy, Jr.

It is certified that error appears in the above-identified patent and that said Letters Patent are hereby corrected as shown below:

Column 2, line 7, change "point" to --port-- and "generally" to --centrally--.

Signed and sealed this 17th day of October 1972.

(SEAL)
Attest:

EDWARD M. FLETCHER, JR.  
Attesting Officer

ROBERT GOTTSCHALK  
Commissioner of Patents